Oct. 11, 1960 T. S. GATES ET AL 2,955,514
INTERNAL GEAR FINISHING MACHINE
Filed July 11, 1957 4 Sheets-Sheet 1
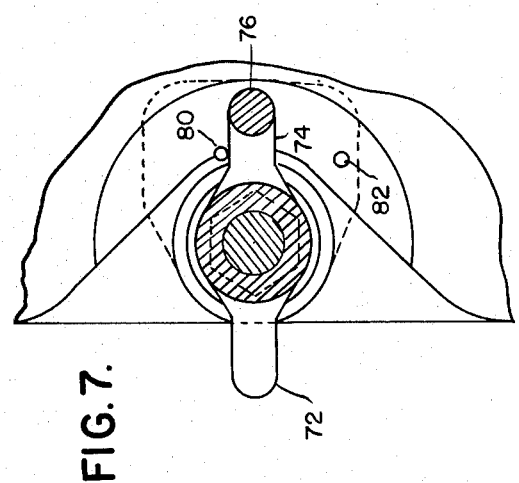
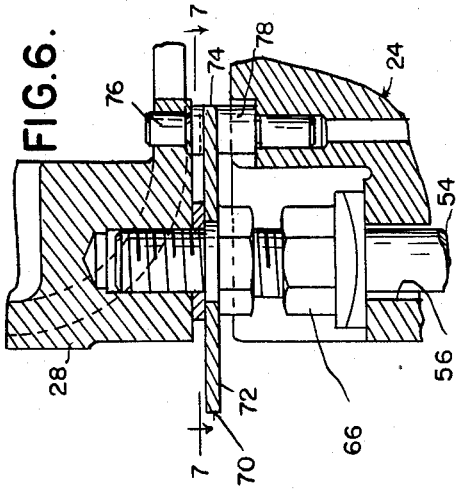
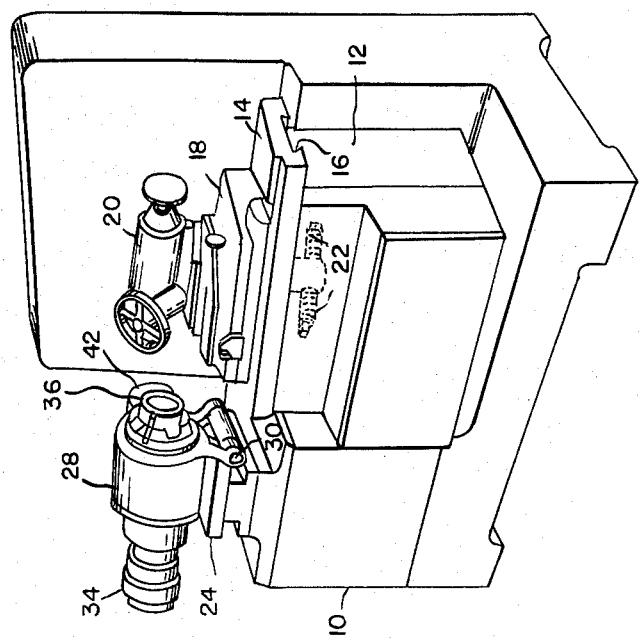
INVENTORS
THOMAS S. GATES
ARTHUR B. BASSOFF
BY
ATTORNEYS Oct. 11, 1960 T. S. GATES ET AL 2,955,514
INTERNAL GEAR FINISHING MACHINE
Filed July 11, 1957 4 Sheets-Sheet 2

INVENTORS
THOMAS S. GATES
ARTHUR B. BASSOFF
BY
Whittemore, Hulbert
Belknap
ATTORNEYS Oct. 11, 1960 T. S. GATES ET AL 2,955,514
INTERNAL GEAR FINISHING MACHINE
Filed July 11, 1957 4 Sheets-Sheet 4

INVENTORS
THOMAS S. GATES
BY ARTHUR B. BASSOFF
ATTORNEYS

United States Patent Office 2,955,514
Patented Oct. 11, 1960

2,955,514

INTERNAL GEAR FINISHING MACHINE

Thomas S. Gates, Grosse Pointe Woods, and Arthur B. Bassoff, Detroit, Mich., assignors to National Broach & Machine Company, Detroit, Mich., a corporation of Michigan Filed July 11, 1957, Ser. No. 671,229

8 Claims. (Cl. 90—1.6)

The present invention relates to a gear finishing machine, and more particularly to a machine designed for finishing internal gears.

It is an object of the present invention to provide a gear finishing machine, particularly for internal gears, comprising means for effecting controlled radial pressure between a work gear and a gear-like tool member.

More specifically, it is an object of the present invention to provide a gear finishing machine having a work spindle and a tool spindle, means mounting one of said spindles for swinging substantially radial movement toward and away from the other spindle, and fluid pressure motor means operatively connected to said movable spindle to control the pressure between the teeth of a gear and gear-like tool carried thereby.

It is a further object of the present invention to provide a gear finishing machine comprising a pair of spindles, fluid pressure motor means for moving one of the spindles substantially radially toward the other of said spindles, and blocking means comprising a pair of elements movable independently into blocking relation for blocking the movable spindle against movement during a machining operation.

It is a further object of the present invention to provide an internal gear finishing machine comprising a base, work supporting structure on said base comprising a table pivoted thereto about a first axis, a work support housing pivoted to said table about a second axis perpendicular to said first axis, a tool slide on said base movable substantially parallel to the axis of the work support, and means connected to said base and including a fluid pressure motor for controlling the radial pressure between a work gear and tool.

Other objects and features of the invention will become apparent as the description proceeds, especially when taken in conjunction with the accompanying drawings, illustrating preferred embodiments of the invention, wherein:

Figure 1 is a simplified perspective view of an internal gear finishing machine constructed in accordance with the present invention.

Figure 6 is an enlarged sectional view on the line 6—6, Figure 3.

Figure 7 is a sectional view on the line 7—7, Figure 6.

Figure 2:
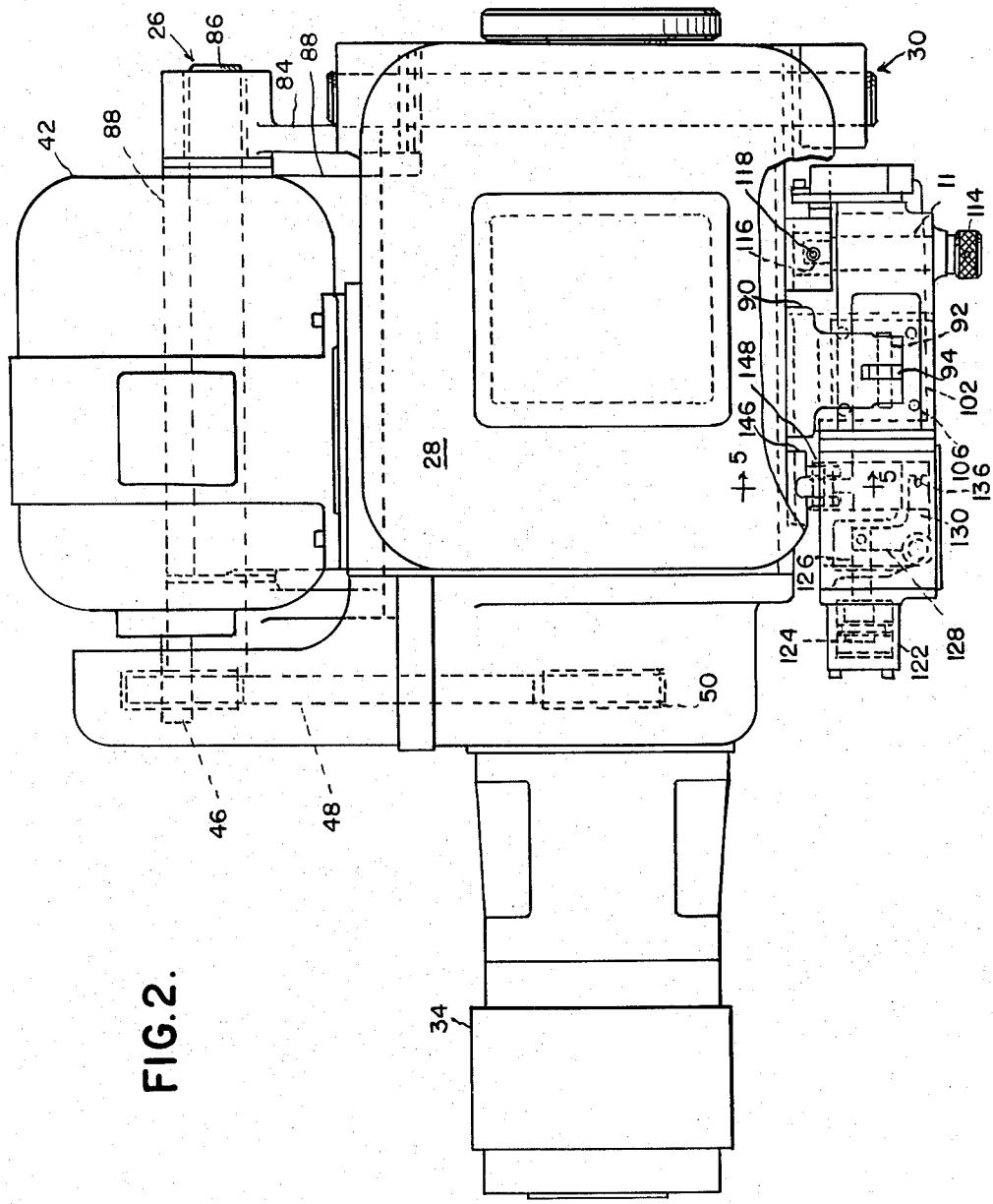
Figure 2 is a plan view of the work spindle housing.

Referring now to Figure 1, the gear finishing machine comprises a main frame 10 having a vertically adjustable knee 12 thereon upon which is mounted a tool slide 14, ways being indicated at 16 for guiding the tool slide 14 thereon. An adjustable tool support 18 is mounted on the slide 14 for angular adjustment about a vertical axis and includes a tool spindle housing 20 carrying a tool spindle upon which a gear-like finishing tool may be mounted. Means are provided within the base for effecting reciprocation of the tool support 18 during a gear finishing operation and this means is diagrammatically indicated in Figure 1 as including a feed screw 22.

Mounted on the base 10 is a table 24 which is adapted to be swung about a horizontal pivot 26 (Figure 2) located rearwardly from the work spindle housing 28. Mounted on the table 24 is a pivot support indicated generally at 30 by means of which the work spindle housing 28 may be angularly adjusted.

It is thus seen from Figure 1 that the internal gear finishing machine includes means for supporting the work spindle housing 28 for angular adjustment about the axis of the pivot 30 which extends perpendicular to the axis of the work spindle housing. In addition, the table 24 is angularly adjustable about the axis of the pivot support 26 which is located laterally from the axis of the work spindle housing 28 and parallel thereto. Accordingly, angular movement of the table 24 about its pivot axis results in producing a substantial vertical component of motion of the work spindle housing 28. In Figure 1 the work spindle housing is shown as connected to an air cylinder 34 which may operate a chuck indicated diagrammatically at 36.

Figure 3:
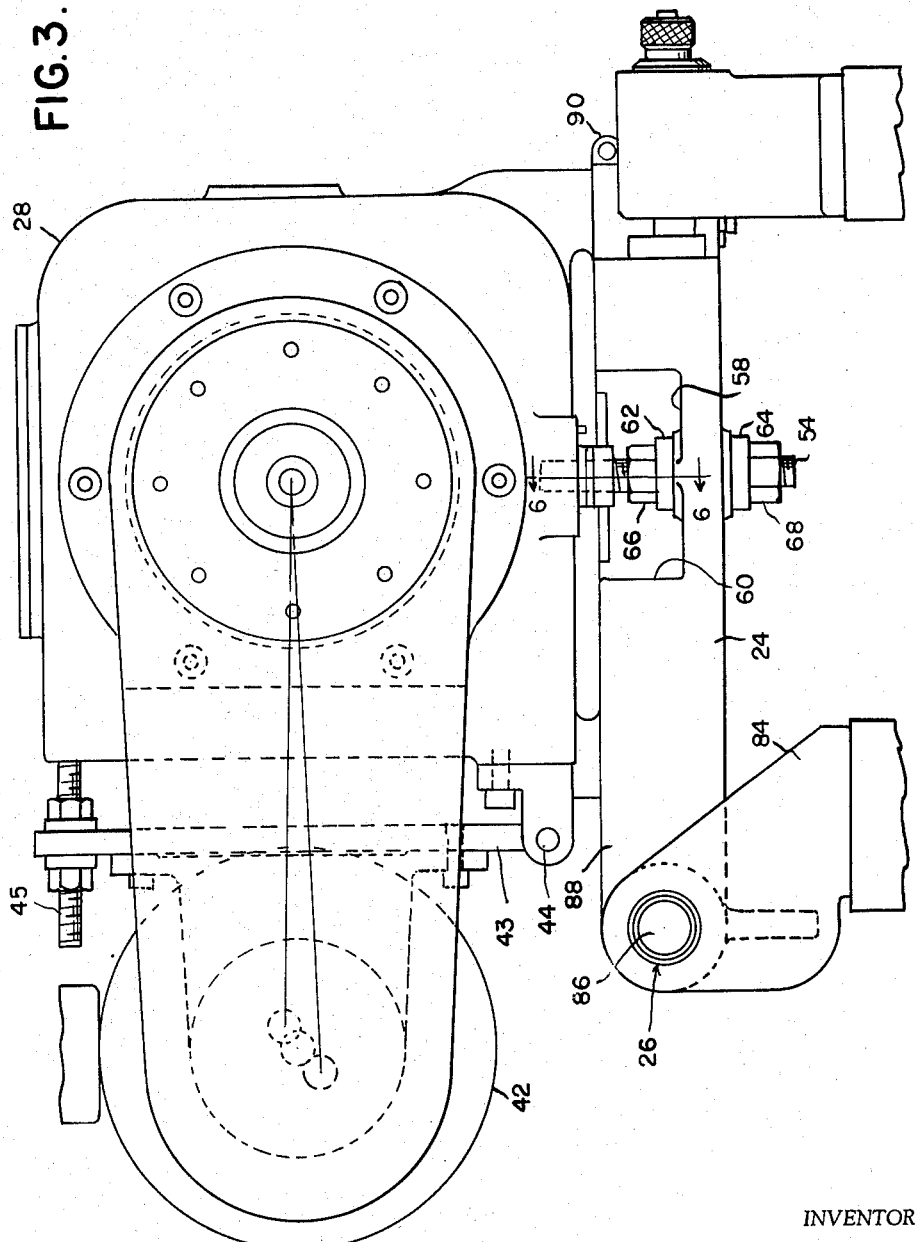
Figure 3 is a front elevational view of the work spindle housing.
Figure 4:
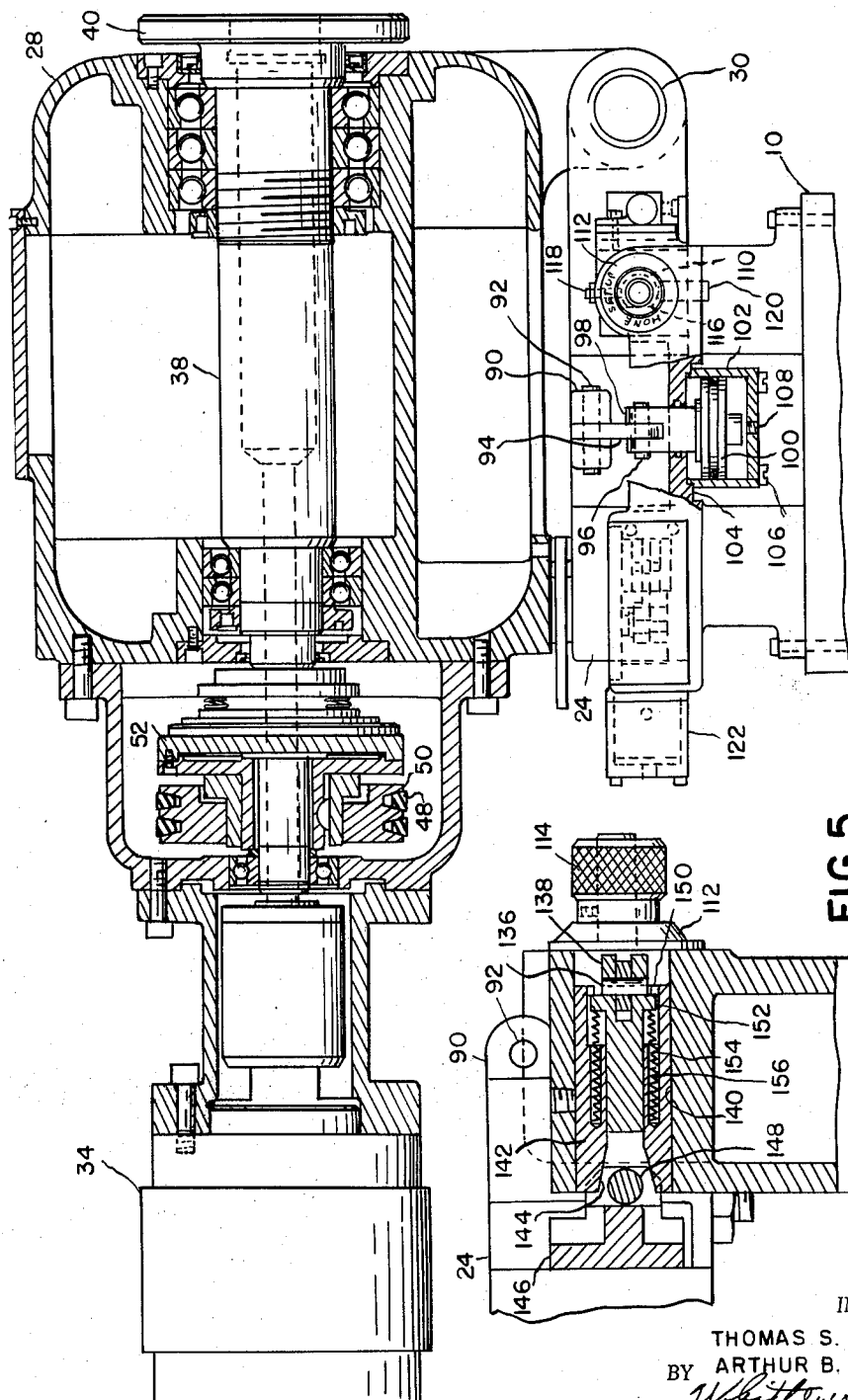
Figure 4 is a side elevational view of the work spindle housing with parts broken away.

In more detail, as seen in Figure 4, the work spindle housing 28 carries the spindle 38 which terminates in a plate 40 to which a suitable chuck is applied. Inasmuch as the work spindle housing 28 is adjustable about two different axes, it is desirable to provide means for driving the spindle in rotation which is movable with the work spindle housing 28. As best seen in Figures 2, 3 and 4, a motor 42 is provided, the motor being rigidly attached to a side of the work spindle housing 28. The attachment is by means of a plate 43 pivoted to a side of the work spindle housing, as indicated at 44, the plate being adjustable between a pair of nuts carried by a threaded stud 45. This arrangement is such that tension in the driving belt connecting the motor to the work spindle may be adjusted. The motor includes an output shaft 46 adapted to be connected by drive belt means 48 to a pulley 50 adapted to be connected to the spindle 38 through suitable clutch means indicated at 52. Thus, the drive motor remains properly connected to the work spindle throughout various adjustments which are provided for the work spindle.

In the operation of the machine the tool spindle is adjusted to bring a gear-like tool thereon into mesh with the teeth of an internal gear carried by the chuck 36 preferably at the underside of the gear. The work spindle housing 28 is adjusted relative to the table 24 to bring its axis strictly horizontal so as to produce uniform teeth from end to end on the gear, or it may be slightly inclined to produce slightly tapered teeth. In any case, after this adjustment is made the work spindle housing is locked in place and remains in adjusted position during subsequent operations.

Means are provided for facilitating the setting of the work spindle housing relative to the table 24 and this means is best illustrated in Figures 3, 6 and 7. At the side of the work spindle housing 28 remote from its pivot support 30 there is provided a depending threaded stud 54 which extends through an enlarged opening 56 provided in a web 58 formed by a recess 60 in the table 24. Spherical washers 62 and 64 are provided at opposite sides of the web and the work spindle housing 28 is adjusted relative to the table 24 by appropriate movement of nuts 66 and 68. Gauge means are provided for insuring horizontal location of the axis of the work spindle housing 28 when so desired, and this gauge means comprises a pivoted member 70 carried by the stud 54 and including an actuating arm 72 and a gauging arm 74. The gauging arm 74 in operative position may be swung between fixed gauge abutments 76 and 78 carried by the work spindle housing 28 and the tabe 24 respectively. Dowel pins 80 and 82 are provided, the dowel 80 serving to locate the gauge arm 74 in alignment with the gauging abutment 76 when in contact therewith.

Figure 5:
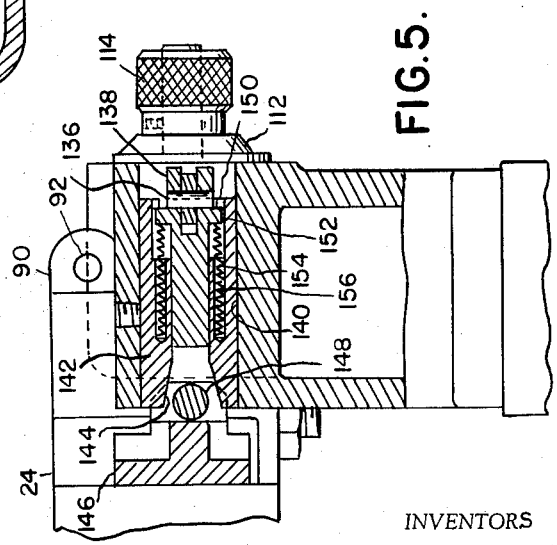
Figure 5 is a fragmentary sectional view on the line 5—5, Figure 2.

Referring now more particularly to Figures 2, 4 and 5, there is illustrated the mechanism for effecting swinging movement of the table 24 and the associated work spindle 28 as a unit about the axis of the pivot support 26. As best seen in Figure 2, the pivot support 26 constitutes arms 84 carried by the base and connected by a pivot pin 86 to a laterally extending portion 88 of the table 24. As best seen in Figure 3, it will be observed that the pivot pin 86 is located below but a substantial distance laterally from the axis of the work spindle housing 28 and accordingly, rocking movement of the table 24 about pivot pin 86 imparts substantial vertical components of motion to a work gear carried by the spindle 38.

At the side of the table 24 opposite to its pivot 26 it is provided with a laterally extending bifurcated member 90 carrying a pin 92 engaging a link 94 connected by a pin 96 to a bifurcated extension 98 provided on a piston 100. The piston is movable vertically in a cylinder 102 which is in the form of a block firmly fastened to the web 104 of the base by suitable fastening means such as screws 106. The underside of the cylinder 102 has a tapped opening 108 for connection of a source of fluid under pressure. Pressure applied to the cylinder 102 below the piston 100 moves the piston upwardly and hence rocks the table 24 upwardly about the axis of pivot pin 86.

Set up means are provided including a rotatable element 110 connected to a dial 112 bearing the indicia "Set Up" and "Hone." The dial is connected to a knob 114. The element 110 has a flat side as indicated at 116 and when this flat side is turned into position to lie between abutment pins 118 and 120 the table 24 is free for rocking movement in a vertical plane. When the parts are in the position shown in Figure 4, the element 110 is engaged between abutment pins 118 and 120 and the table is rigidly supported in true horizontal position for set up purposes.

Means are also provided for locking the table 24 in any intermediate adjusted position. This means comprises an air cylinder 122 having a piston 124 therein connected by a piston rod 126 to one arm 128 of a bell crank lever, the other arm 130 of which engages a pin 136 of an actuator 138, best seen in Figure 5. The actuator 138 is horizontally movable in a cylinder 140 in which are also movable two independent blocking elements 142 each of which has an inclined abutment surface 144.

Attached to the table 24 is a bracket 146 carrying a pin 148 which is movable between the abutment surfaces 144.

Abutment elements 142 each include lateral projections 150 overlying laterally extending projections 152 on the actuator 138. Seated against the projections 152 and extending into recesses 154 in the actuating elements are compression springs 156 urging the blocking or abutment elements 142 to the left, as seen in Figure 5. When fluid under pressure is admitted to the cylinder 122 to rock the bell crank clockwise as seen in Figure 2, the actuator 138 is moved to the right as seen in Figure 5, thus positively withdrawing both of the elements 142 to the clearance position shown which provides clearance for movement of the pin 148 therebetween. At this time fluid may be admitted to the cylinder 102 to move the table 24 upwardly to apply a predetermined pressure acting radially between the gear and gear-like tool and if desired, the actuator may at this time be moved to the left as seen in Figure 5, thus leaving the two blocking elements 142 free for independent movement under the influence of their respective springs. The elements will thus move forwardly until their forward movement is arrested by engagement with the pin 148. If the pin is moved out of a central position, obviously one of the elements will advance further than the other. However, both elements move into blocking position with the result that the pin 148 is positively and mechanically blocked against movement so long as the actuator 138 is in position to permit the blocking elements to operate.

It is thus possible to operate the machine to bring the gear and gear-like tool into mesh with a predetermined pressure which is of course controlled by controlling the pressure of fluid supplied to the cylinder 102. After the gear and tool have been brought into operating position, the gear finishing operation may continue while pressure is maintained in the cylinder 102. The machining cycle involves rotation of the work spindle by the motor 42 and back and forth traverse of the tool slide 14 in a direction substantially parallel to the axis of the work spindle. As material is removed from the surfaces of the work teeth, the pressure acting in the cylinder 102 will continue to swing the table 24 upwardly so as to maintain the tool in continuous constant pressure against the teeth of the gear. Alternatively, if desired, the cylinder 122 may be operated so as to block the table 24 against further swinging after it has been moved upwardly to bring the tool and gear into predetermined pressure contact. Thereafter, the gear and tool may be rotated and tool traversed as before. Further, if desired, the cylinder 122 may be operated periodically, as for example at the end of one or more traverse strokes, so as to provide further infeed between the tool and work and then operated to block feeding during subsequent traverse strokes.

Reference was made to the fact that the tool may engage the underside of the gear, in which case sufficient pressure is admitted to the cylinder 102 to overcome the weight of the table 24 and of the structure supported thereby, with an additional amount available to provide a predetermined substantially constant pressure between the teeth of the gear and tool. Alternatively of course, the tool may be engaged at the upper side of the gear in which case the pressure contact between the gear and tool may be controlled by applying a pressure to the cylinder 102 which counterbalances a predetermined portion of the weight of the table 24 and assembly carried thereby but leaves a portion of the weight uncounterbalanced to provide the operating pressure between the gear and tool.

The pressure admitted to the cylinders 102 and 122 may be any fluid pressure, either a hydraulic fluid or air. Although it is recognized that air is compressible, it nevertheless affords a steady and effective support for the table 24. Evidently, this is due to the fact that there is a relatively great mass of material supported by the air pressure within the cylinder which opposes any tendency to vibrate. Moreover, in the gear finishing operation, the gear and tool are rotated at substantial speeds so that in correcting errors such for example as eccentricity, fairly rapid oscillation of the table and supported structure would necessarily result if the center distance between the gear and tool changed during each revolution of the gear. Instead, apparently at the high side of the gear, substantially greater pressure between the gear and tool is developed which removes material more rapidly from the high side of the gear until a condition of true concentricity is produced.

While the apparatus disclosed herein may be used in any gear finishing operation such as gear shaving, gear lapping or gear honing, it is particularly useful in a gear honing operation in which the tool is in the form of a gear having its toothed portion formed of a relatively hard, strong but slightly yieldable and highly resilient plastic material having abrasive particles embedded therein.

The drawings and the foregoing specification constitute a description of the improved internal gear finishing machine in such full, clear, concise and exact terms as to enable any person skilled in the art to practice the invention, the scope of which is indicated by the appended claims.

We claim as our invention is:

1. A gear finishing machine comprising a base, a table having a first horizontal pivot connection at one edge to said base, a work spindle support housing having a second horizontal pivot connection to said table having an axis extending perpendicularly to the axis of said first pivot connection, a substantially horizontal work spindle in said housing having an axis parallel to the axis of one of said pivot connections, a tool slide mounted on said base for horizontal traverse toward and away from said work spindle, a tool spindle carried by said slide, motor means mounted on said housing, means connecting said motor to said work spindle for driving said work spindle in rotation, and power means for traversing said slide.

2. A gear finishing machine comprising a base, a table having a horizontal pivot connection at one edge to said base, a work spindle support housing having a horizontal pivot connection to said table, a substantially horizontal work spindle in said housing, fluid motor means connected between said base and said table and operable to swing said table upwardly to control pressure between a work gear and gear-like tool, a tool slide mounted on said base for horizontal traverse toward and away from said work spindle, a tool spindle carried by said slide for angular adjustment about a vertical axis, motor means for driving one of said spindles in rotation, and power means for traversing said slide.

3. An internal gear finishing machine comprising a base establishing a reference plane, a work spindle having an intermediate operating position parallel to said plane, a tool spindle parallel to said plane, means for adjusting said tool spindle about an axis perpendicular to said plane, means for traversing said tool spindle parallel to said plane toward and away from said work spindle, means for driving one of said spindles in rotation, means for adjusting said work spindle about an axis perpendicular to its own axis, and means for swinging said work axis about a second axis substantially parallel to its own axis and located laterally therefrom with respect to said reference plane to provide bodily movement of said work spindle toward and away from said reference plane, and fluid motor means connected to said work spindle to swing said work spindle about said second axis to control pressure between a gear to tool on said spindle.

4. An internal gear finishing machine comprising a base establishing a reference plane, a work spindle having an intermediate operating position parallel to said plane, a tool spindle parallel to said plane, means for adjusting said tool spindle about an axis perpendicular to said plane, means for traversing said tool spindle parallel to said plane toward and away from said work spindle, motor means for driving said work spindle in rotation, means for adjusting said work spindle about an axis perpendicular to its own axis, and means for swinging said work axis about a second axis substantially parallel to its own axis and located laterally therefrom with respect to said reference plane to provide bodily movement of said work spindle toward and away from said reference plane, and fluid motor means connected to said work spindle to swing said work spindle about said second axis to control pressure between a gear to tool on said spindle, said motor means being connected directly to said work spindle, and means mounting said motor means for bodily movement with said work spindle about said axes.

5. In a gear finishing machine, a work spindle for mounting a gear to be finished, a tool spindle for mounting a gear-like finishing tool in mesh with said gear, means for driving one of said spindles in rotation, fluid pressure means for moving one of said spindles radially toward the other to engage the gear and tool in controlled pressure contact, and locking means for locking said one spindle rigidly against further approach toward said other spindle, said locking means comprising a member movable with said one spindle during movement toward said other spindle, a pair of abutment elements at opposite sides of said member having inclined abutment surfaces, a movable actuator movable toward and away from said member, means on said actuator engageable directly with said elements to effect positive movement of said elements away from said member, and yieldable means urging said elements away from said actuator and into rigid blocking engagement with said member upon movement of said actuator toward said member.

6. In a gear finishing machine, a work spindle for mounting a gear to be finished, a tool spindle for mounting a gear-like finishing tool in mesh with said gear, means for driving one of said spindles in rotation, fluid pressure means for moving one of said spindles radially toward the other to engage the gear and tool in controlled pressure contact, locking means for locking said one spindle rigidly against further approach toward said other spindle, said locking means comprising a member movable with said one spindle, independently movable rigid blocking elements movable into engagement with said member, resilient means urging said elements into blocking engagement, and an actuator for moving said elements out of blocking engagement with said member.

7. An internal gear finishing machine comprising a base, a substantially horizontal work spindle mounted on said base for angular adjustment about a first horizontal axis perpendicular to and spaced substantially below its own axis and for bodily movement about a second horizontal axis parallel to and spaced a substantial distance laterally from its own axis, motor means for driving said work spindle mounted for movement therewith about said first and second axes, a tool spindle mounted on said base for angular adjustment about a third vertical axis perpendicular to the axes of both of said spindles and intersecting its own axis, and means for traversing said tool spindle in a direction substantially parallel to the axis of said work spindle.

8. An internal gear finishing machine comprising a base, a work spindle mounted on said base for angular adjustment about a first axis perpendicular to its own axis and for bodily movement about a second axis parallel to its own axis, motor means for driving said work spindle mounted for movement therewith about said first and second axes, a tool spindle mounted on said base for angular adjustment about a third axis perpendicular to the axes of both of said spindles and intersecting its own axis, means for traversing said tool spindle in a direction substantially parallel to the axis of said work spindle, and fluid pressure motor means connected to said work spindle to bias said work spindle for movement about said second axis to control the pressure between a gear and tool on said spindles.

References Cited in the file of this patent

UNITED STATES PATENTS

| | | |
|---|---|---|
| 2,277,041 | Drummond | Mar. 24, 1942 |
| 2,411,973 | Mentley | Dec. 3, 1946 |
| 2,433,468 | Mackmann et al. | Dec. 30, 1947 |
| 2,598,431 | Praeg | May 27, 1952 |

FOREIGN PATENTS

| | | |
|---|---|---|
| 586,193 | Great Britain | Mar. 11, 1947 |